Jan. 21, 1964  C. F. OSGOOD  3,118,532
FLEXIBLE IDLER ROLLER FOR A CONVEYOR BELT
Filed June 6, 1960
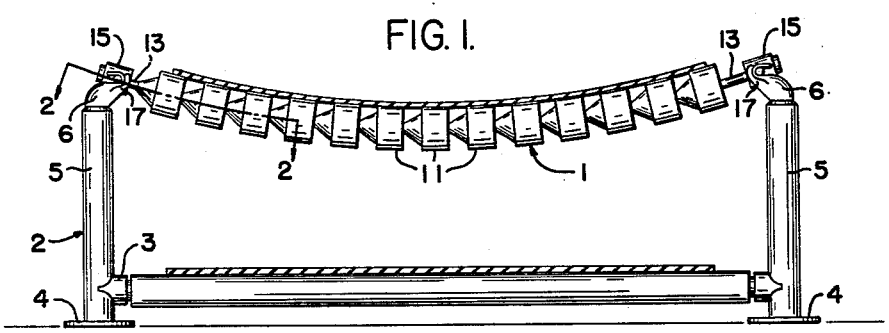
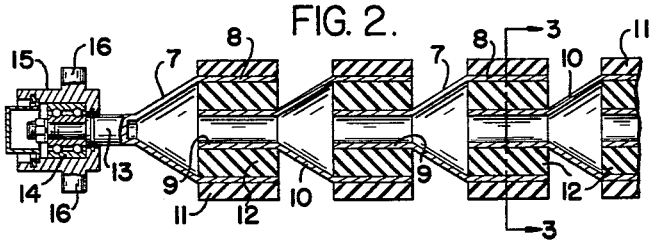 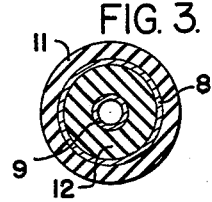
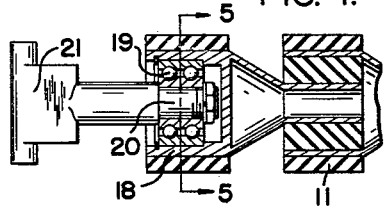 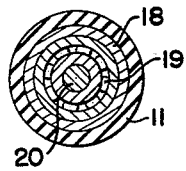 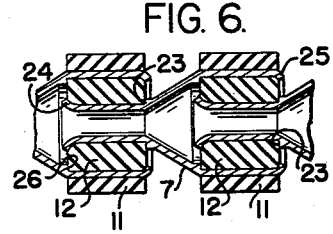
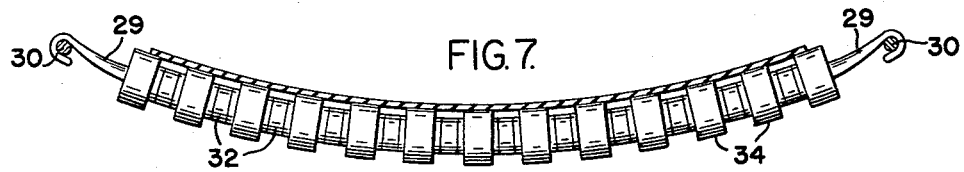
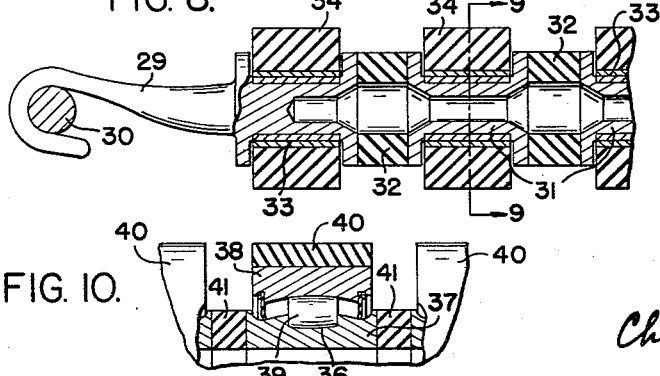 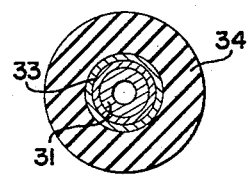
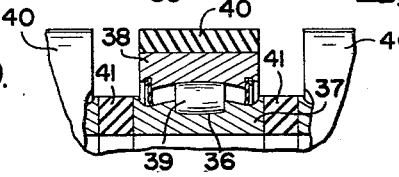
INVENTOR:
Charles F. Osgood, United States Patent Office 3,118,532
Patented Jan. 21, 1964

3,118,532
FLEXIBLE IDLER ROLLER FOR A CONVEYOR BELT
Charles F. Osgood, Franklin, Pa., assignor to Joy Manufacturing Company, Pittsburgh, Pa., a corporation of Pennsylvania
Filed June 6, 1960, Ser. No. 34,281
2 Claims. (Cl. 198—192)

This invention relates to idler rollers and more particularly to flexible idler rollers adapted for suspension in catenary form for guiding an endless conveyor belt.

In known forms of flexible idler rollers the idler roller means for supporting and guiding the upper conveying run of the conveyor belt are usually mounted on a flexible metallic core, sometimes in the form of a wire rope or flexible rod, and assumes different catenary shapes when subjected to varying belt loads, all in a well known manner. The present invention contemplates improvements over such known types of flexible idler rollers in that the central metallic core on which the idler roller means is mounted is omitted and the idler roller means are mounted on a series of spaced apart metallic annuli connected by intermediate annular members of rubber or similar material bonded in axial shear to the metal parts, thus to provide a unitary flexible roller support. By the provision of the resiliently connected roller supporting parts an idler roller is provided having characteristics greatly improving the efficiency and durability of the roller parts resulting in greater life of the idler even when subjected to adverse conditions.

It is therefore an object of the present invention to provide a conveyor belt idler of an improved design and construction. Another object is to provide an improved flexible belt idler adapted for support in catenary form and having an improved flexible construction resulting in greater efficiency and increased life even under severe operating conditions. A further object is to provide an improved flexible belt idler composed of a series of spaced apart metallic hollow roller supporting annuli permanently connected by rubber or similar material bonded in axial shear between the parts to provide for the desired flexibility. Yet another object is to provide an improved flexible belt idler wherein the usual flexible metallic core is omitted thereby overcoming certain disadvantages thereof and greatly increasing efficiency and durability. These and other objects and advantages of the invention will, however, hereinafter more fully appear.

In the accompanying drawing there are shown for purposes of illustration several forms and modifiiations which the invention may assume in practice.

In this drawing:

FIG. 1 is an elevational view of a preferred form of the improved conveyor belt idler showing the same in suspended catenary position on a supporting stand and having a rotatable flexible roller support.

FIG. 2 is an enlarged fragmentary axial section taken on line 2—2 of FIG. 1, showing the improved idler construction of the preferred embodiment.

FIG. 3 is a cross section taken on line 3—3 of FIG. 2.

FIG. 4 is a detail section taken on the plane of FIG. 2, showing a modified form of bearing mounting.

FIG. 5 is a cross section taken on line 5—5 of FIG. 4.

FIG. 6 is a fragmentary axial section, taken on the plane of FIG. 2, showing another modification.

FIG. 7 is an elevational view of a modified belt idler having a non-rotatable flexible roller support on which idler rollers are journaled.

FIG. 8 is an enlarged fragmentary axial section taken on a vertical plane through the idler of FIG. 7.

FIG. 9 is a cross section taken on line 9—9 of FIG. 8.

FIG. 10 is a fragmentary section showing a modification of FIG. 8.

In the several forms of the invention disclosed the flexible idler roller, generally designated 1, is supported on a usual floor stand, generally designated 2, having a frame 3 provided with supporting feet 4 and having upstanding side elements 5 supporting brackets 6 from which the idler roller is suspended in catenary form. Evidently the idler roller may be supported in any suitable known manner.

The idler roller guides the upper run of an endless conveyor belt, while the lower run is guided by a bottom roller journaled on the side members of the floor stand, all in a manner disclosed in my copending application Serial No. 2,526, filed January 14, 1960, now abandoned.

The idler roller of the preferred embodiment shown in FIGS. 1, 2 and 3 comprises a series of spaced apart sleeve-like annuli or cuplike metallic elements 7 in the form of hollow metal spools having enlarged circular portions 8, reduced sleeve portions 9 and connecting frusto-conical portions 10. Suitably secured as by bonding to and surrounding the enlarged circular portions 8 are idler roller portions or roller elements 11 desirably composed of an elastomer such as rubber or similar material.

Bonded to the interior of the enlarged circular portions 8 of the spools within the latter and to the exterior of the concentric reduced sleeve portions 9 are resilient annuli desirably in the form of resilient rings or washers 12 likewise desirably composed of rubber or similar elastomeric material. These rubber annuli are bonded in axial shear to the adjacent concentric surfaces of the metal spools thereby to provide a flexible or yieldable supporting structure for the idler rollers. Thus there is provided a yielding interengaging connection lying within each roller element 11 with the axial opening in each elastomeric annuli 12 providing a socket for receiving the axial projection on the next adjacent roller element. The metal parts at the remote ends of the idler have shaftlike portions or extension rods 13 suitably journaled in anti-friction bearings 14 (FIG. 2) supported within swivelled bearing housing 15 carried by the idler stand brackets 6. In this particular construction, the bearing housings 15 have lateral trunnions 16 pivotally engaging hooklike elements 17 of the brackets, the latter elements in turn swivelly mounted to turn about upright axes of the stand side elements 5 thus to provide universal swivel mountings for the flexible roller supports.

In the modification shown in FIGS. 4 and 5 an end spool 18 of the flexible roll support houses an anti-friction bearing 19 supported by a shaftlike element or rod 20 secured to a trunnion member 21 pivotally engaging the hooklike element 17 of the universal mounting bracket above described. Otherwise, this structure is similar to the preferred embodiment. The modification shown in FIG. 6 is quite like that of FIG. 2 with the exception that the spool-like elements 7 have shoulders 23 and the ends of the reduced sleeve-like portions headed over or beaded at 24 thereby firmly to hold the rubber annuli in position. Upon assembly the rubber annuli may be stretched or pressed over the end beads of the sleeves, as they are placed in position for bonding. If desired the outer enlarged circular portions 8 of the spools may have inwardly bent flanges 25 and suitable shoulders as indicated at 26, thus further to insure proper retention of the rubber annuli between the concentric metal parts.

The modified embodiment shown in FIGS. 7, 8 and 9 has its flexible roller support provided with end support members 29 of hooklike form which engage suitable side supports 30 as for example side ropes or rods in turn supported by suitable floor stands, in a well known manner. The flexible idler, in this instance, comprises a series of flanged hollow metal elements or hollow spools 31 between the adjacent faces of which resilient annuli 32 composed of rubber or like elastomeric material are bonded to the metal parts thereby to provide yieldable connections between the metal parts. Arranged in a suitable manner axially about the spool bodies between the spool-flanges are suitable bearings 33 which may be composed of lubricant impregnated nylon or other suitable material and journaled on these bearings between these flanges are rollers 34 likewise desirably composed of rubber or similar material. These rollers may be stretched in a suitable manner over the spool flanges into contact with their respective bearings, upon assembly. Thus the flexible catenary support of this embodiment is non-rotatable and the idler rollers are journaled for rotation relative to their support.

In the modification shown in FIG. 10 there are antifriction bearings 36 of the well known barrel type having usual annular inner races 37 and annular outer races 38 with roller bearing elements 39 arranged between the race elements. Rubber rollers 40 are bonded to the outer races and rubber annuli 41 are bonded to the adjacent end faces of the inner bearing races 37 and thereby serve resiliently to connect the bearings together in series to provide a resilient catenary support for the idler rollers.

In the several embodiments disclosed, the rubber annuli between the roll supporting parts, permit limited axial stretching of the idler as the load-catentary deepens and the metal parts may be formed positively to limit such axial stretching movement between the parts, to prevent undue elongation of the idler.

As a result of this invention an improved resilient idler roll structure for a conveyor belt is provided whereby increased efficiency and ruggedness are obtained. By the provision of the metallic roll supporting elements yieldingly connected by rubber annuli bonded thereto the usual central metallic core present in known types of idlers is omitted. The series of spaced apart metal roller supporting elements connected together by rubber annuli bonded in axial shear thereto result in an idler roller construction having substantial advantages over flexible belt idlers of known types. The series of rigid roller supports and connecting rubber annuli provide for limited axial stretching of the idler as the load-catenary deepens, thus to improve guiding of the conveyor belt. The elastomeric annuli also provide for limited torsional yielding of the roller elements relative to each other. These and other advantages of the invention will be clearly apparent to those skilled in the art.

While there are described in this application several forms and modifications which the invention may assume in practice, it will be understood that these forms and modifications of the same are shown for purposes of illustration and that the invention may be further modified and embodied in various other forms without departing from its spirit or the scope of the appended claims.

What I claim is:

1. A flexible idler for conveyor belts having multiple rollers and an elongated continuous flexible roller support adapted for suspension in catenary form, said flexible support comprising a series of spaced apart metal rolls supporting annuli and elastomeric annuli bonded in axial shear to the adjacent surfaces at the end portions of the metal annuli for connecting the latter together, said flexible support extending longitudinally through said rollers and normally maintained under axial tension when under load, said elastomeric annuli increasing in length axially as the idler load increases.

2. A flexible idler for conveyor belts having multiple rollers and an elongated continuous rotatable flexible roller support extending longitudinally through said rollers and adapted for suspension in catenary form between end bearings, said support comprising a series of spaced apart metal roller supporting annuli connected together by annuli of elastomeric material bonded in axial shear thereto, with said elastic annuli providing the sole connections between the metal parts, said elastomeric annuli normally being under tension and stretching axially as the load on the idler increases.

References Cited in the file of this patent

UNITED STATES PATENTS

| 981,471 | Proal | Jan. 10, 1911 |
| 2,820,541 | Barnish et al. | Jan. 21, 1958 |
| 2,892,533 | LoPresti et al. | June 30, 1959 |

FOREIGN PATENTS

| 147,154 | Australia | July 6, 1951 |
| 890,337 | France | Feb. 4, 1944 |
| 835,576 | Germany | Apr. 3, 1952 |
| 1,079,546 | Germany | Apr. 7, 1960 |